Patented Aug. 12, 1941

2,252,479

UNITED STATES PATENT OFFICE 2,252,479

PROCESS FOR OBTAINING ESTERS OF POLYMERIC METAPHOSPHORIC ACID

Anneliese Beyer, Berlin, Germany, assignor to Chemische Fabrik Joh. A. Benckiser, Ludwigshafen-on-the-Rhine, Germany No Drawing. Application March 17, 1937, Serial No. 131,533. In Germany March 19, 1936

5 Claims. (Cl. 260—403)

It is known that organic compounds with hydroxyl groups or unsaturated linkages readily react with polybasic acids, such as sulphuric acid, organic polysulphonic acids and the like, with formation of water-soluble acid esters.

Further such esterification products, e. g. with hydroxy-aliphatic acids or fatty alcohols, have already been prepared with the aid of tribasic orthophosphoric acid.

It has now surprisingly enough been found that the metaphosphoric acid is capable in its polymeric form $(HPO_3)_n$ (where $n$ may have values of from 3 to 12) of converting organic compounds containing hydroxyl groups or unsaturated linkages or both into water-soluble and technically valuable derivatives. For this purpose are particularly suitable the polymeric metaphosphoric acids, which are water-free or contain only a few percent of water, which obviously may occur in the form of polybasic complex acids and are able to form water-soluble acid metaphosphates. Similar in action to the thickly liquid polymeric metaphosphoric acids are the acid fusion mixtures which contain alkali metal metaphosphates and metaphosphoric acids, for example in the molecular ratio of 1:1. If necessary or desired other substances, such as acetic acid anhydride, sulphuric acid or the like, may be present during the carrying out of the reaction for the purpose of binding water.

In this way from polymeric metaphosphoric acids and hydroxy fatty acids, unsaturated fatty acids or glycerides thereof, such as for example castor oil or oleic acid, water soluble derivatives are formed with generation of heat. In a similar way unsaturated hydrocarbons such as for example octadecylene as well as the higher fatty alcohols or naphthenyl alcohols of saturated and unsaturated character may also be brought into interaction with polymeric metaphosphoric acids. Further, compounds like ethyl alcohol, propyl alcohols, glycerine, polyglycerines, vinyl alcohol or polyvinyl alcohols, sugar, starch, benzyl alcohol, phenols, hydro-phenols and the like may also without difficulty be brought into interaction with polymeric metaphosphoric acids, in which case partly intermediate products form, which find use for introducing alkyl, aralkyl, aryl or cycloalkyl groups, and partly technically directly utilisable products are obtained.

The acid esters of polymeric metaphosphoric acids may in general be neutralised directly or after taking up in water, aqueous or alcoholic solutions of alkali hydroxides or also alkali carbonates or other alkaline reacting salts such as for example acetates or finally ammonia being used as neutralising agent. However, for obtaining anhydrous neutralisation products for example, it is also possible to use organic bases such as methylamine, pyridine, triethanolamine and so forth.

Example 1

240 parts by weight of castor oil are introduced in a kneading machine into 400 parts by weight of anhydrous hexametaphosphoric acid, the temperature rising as a result to 40°. The reaction product, soluble clearly in water, is then thoroughly worked with 440 parts by weight of water whilst cooling and introduced into a settling vessel. After layer separation has taken place the metaphosphoric acid ester which has separated at the top is neutralised with 250 parts by volume of concentrated ammonia, whereby a viscous oil is formed which in soft and hard water yields clear frothing solutions. The neutralisation may also be carried out with pyridine. The product is used as an auxiliary agent in wool dyeing or in leather greasing.

Example 2

280 parts by weight of oleyl alcohol are, in accordance with Example 1, thoroughly mixed with 500 parts by weight of hexametaphosphoric acid, the temperature being allowed to rise up to 45°. After water solubility has been attained the reaction product is worked up with 520 parts by weight of water and is then neutralised with 670 parts by volume of caustic soda having a density of 38° Bé. In this way a yellowish oil is formed which is soluble with frothing even in water of 100° DH. and is suitable as a wetting agent for textile fibres. In place of olein alcohol the equivalent quantity of coconut oil alcohols may also be used, when a washing agent is formed suitable for treating the human hair.

Example 3

200 parts by weight of olein and 100 parts by weight of acetic acid anhydride are consecutively introduced into 400 parts by weight of octometaphosphoric acid, as a result of which the temperature rises up to 40°. The reaction product is washed with 600 parts by volume of a 12% common salt solution and neutralised with triethanolamine. A washing agent is formed.

Example 4

250 parts by weight of trimetaphosphoric acid are converted with 74 parts by weight of n-butanol to the acid n-butyltrimetaphosphoric acid ester, which can be used for butylations or, by interaction with higher alcohols at higher temperatures, yields the acid metaphosphates thereof with splitting off of butanol. Instead of butanol the equivalent quantities of benzyl alcohol, cyclohexanol or cresol may be employed.

Example 5

Equal parts by weight of potato starch and the acid fusion mixture hexametaphosphoric acid-sodium hexametaphosphate, $(NaPO_3.HPO_3)_6$, are moistened in the finely powdered state with alcohol and are thoroughly worked for several hours in a mixing machine, whereupon by slow heating the alcohol is distilled off and the conversion to the sodium salt of the starch metaphosphoric acid ester is completed. The reaction product is used for sizing and dressing purposes.

The acid metaphosphoric acid esters as well as their salts with mono-acid bases interact readily particularly in aqueous solutions with compounds of divalent or polyvalent metals, such as for example with salts of calcium, magnesium, chromium, iron, copper or the like to form complex compounds which, like the known sodium calcium hexametaphosphates, contain the multivalent metal in non-ionized or only weakly ionized form. It is thus possible without any difficulty with the aid of the afore-described compounds to bind in a complex manner the hardness formers of water or to bring lime soaps into solution. For example one can interact chromic salts with the product according to Example 1 in aqueous solution, or the said product can be employed in tanning liquors containing chromium, without chromium compounds precipitating out. Similarly aqueous solutions of the product according to Example 2 take up appreciable quantities of aluminum, iron or copper compounds without precipitations taking place. Such interactions are not possible with the corresponding sulphuric acid esters and permit of many applications in the textile, leather and fur industries for impregnating, preserving and the like purposes.

What I claim is:

1. A process for obtaining water-soluble esters of polymeric metaphosphoric acids, which comprises mixing a polymeric metaphosphoric acid with an aliphatic compound containing at least one hydroxyl group.

2. A process as claimed in claim 1 in which the aliphatic compound contains also an unsaturated carbon linkage.

3. A process for obtaining water-soluble esters of polymeric metaphosphoric acids, which comprises mixing a polymeric metaphosphoric acid with an aliphatic compound containing one hydroxyl group and neutralizing the reaction products.

4. A process for obtaining water-soluble esters of polymeric metaphosphoric acids, which comprises mixing a polymeric metaphosphoric acid with an aliphatic compound containing an aliphatic unsaturated carbon linkage and neutralizing the resulting reaction products.

5. A process for obtaining water-soluble esters of polymeric metaphosphoric acids, which comprises mixing a polymeric metaphosphoric acid with aliphatic compounds containing an aliphatic unsaturated carbon linkage.

ANNELIESE BEYER.